No. 645,396. Patented Mar. 13, 1900.
J. W. HULL.
HARVESTING MACHINE.
(Application filed Jan. 21, 1899.)
(No Model.) 2 Sheets—Sheet 2.
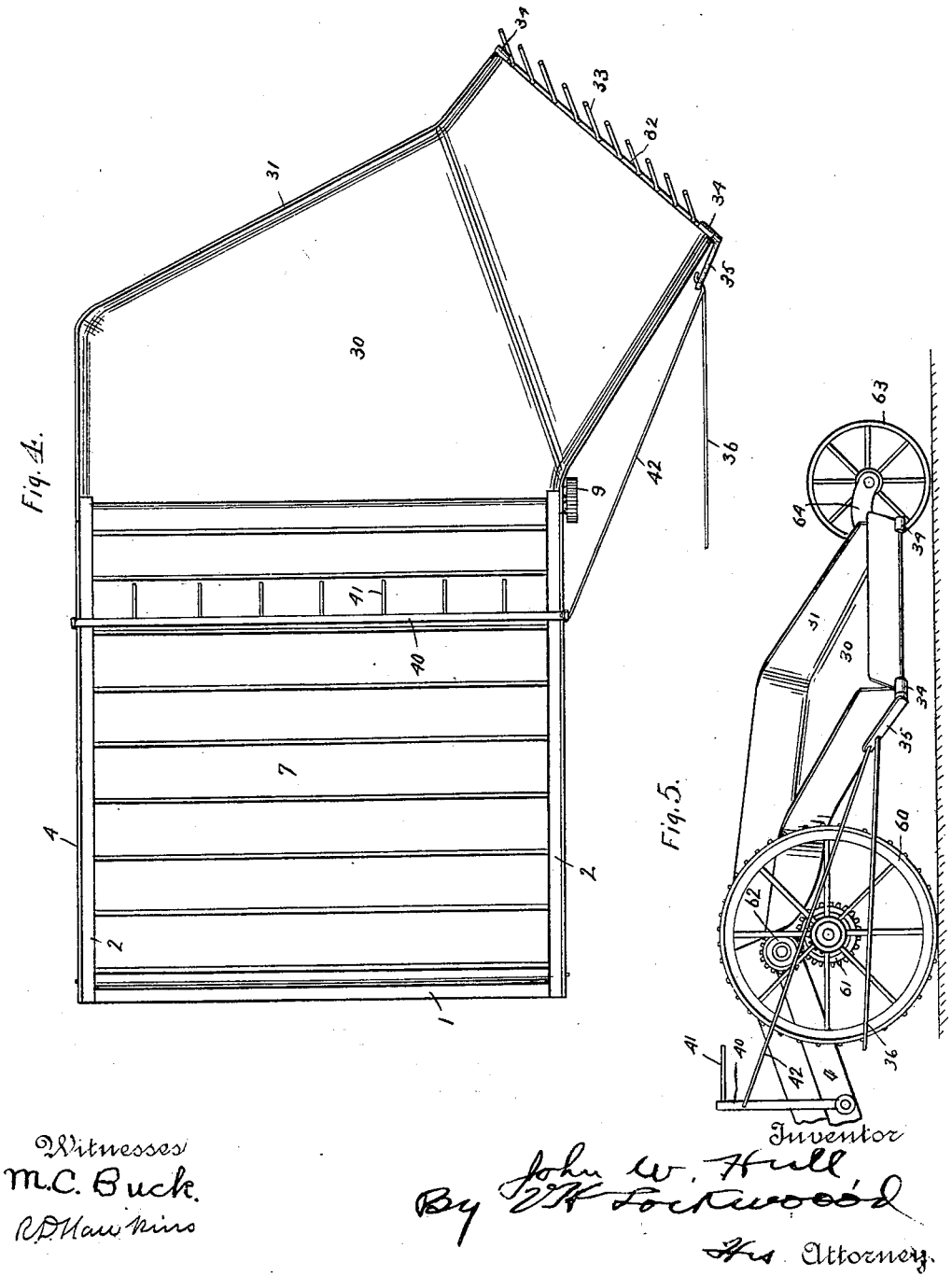
Witnesses
M. C. Buck.
R. D. Hawkins
Inventor
John W. Hull,
By V. K. Lockwood
His Attorney.

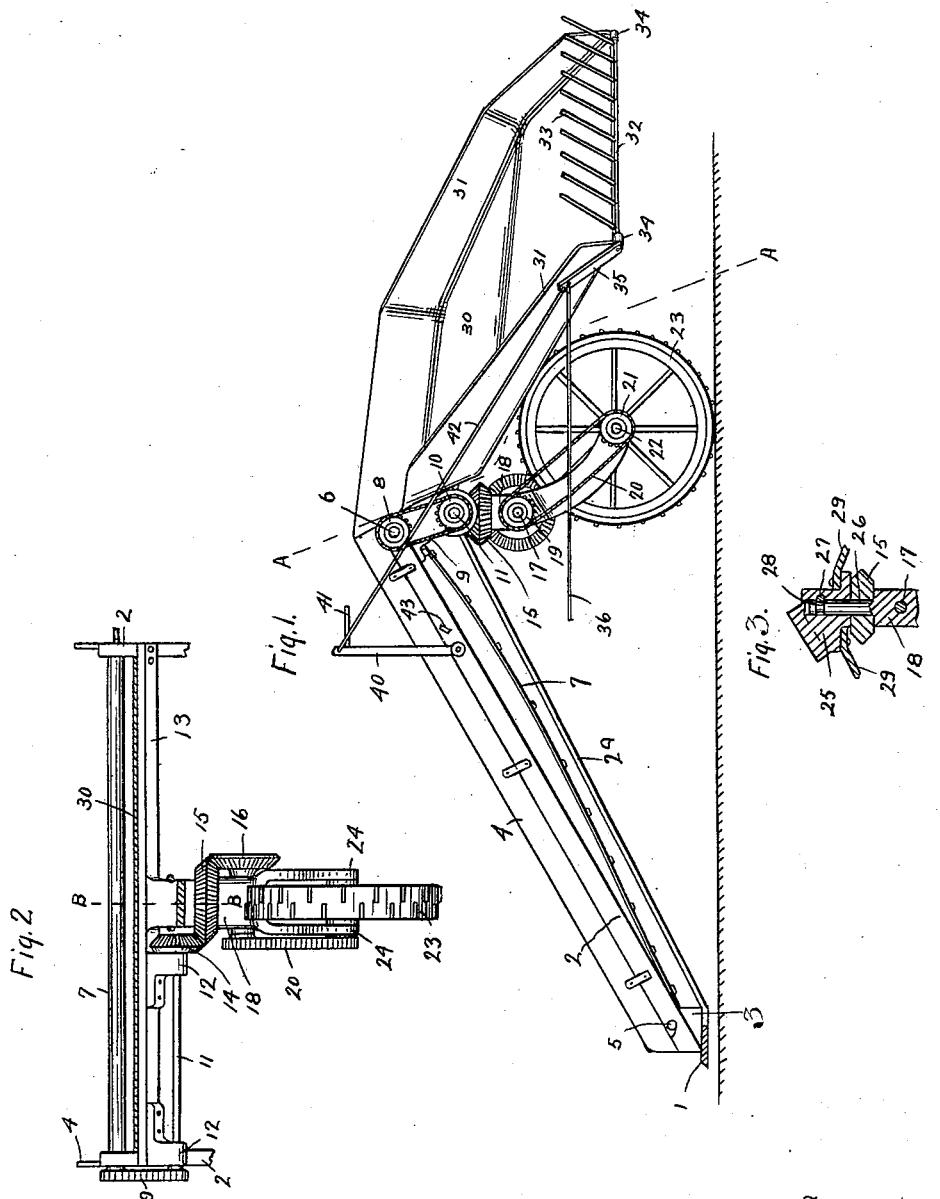

UNITED STATES PATENT OFFICE.

JOHN W. HULL, OF INDIANAPOLIS, INDIANA, ASSIGNOR OF ONE-HALF TO ANDERSON BRUNER, OF SAME PLACE.

HARVESTING-MACHINE.

SPECIFICATION forming part of Letters Patent No. 645,396, dated March 13, 1900.

Application filed January 21, 1899. Serial No. 702,935. (No model.)

*To all whom it may concern:*

Be it known that I, JOHN W. HULL, of Indianapolis, county of Marion, and State of Indiana, have invented a certain new and useful Harvesting-Machine; and I do hereby declare that the following is a full, clear, and exact description thereof, reference being had to the accompanying drawings, in which like figures refer to like parts.

My invention relates to a bunching attachment for mowers and similar harvesting-machines.

My object is to provide a convenient and readily-operative means for bunching clover and similar agricultural products, and especially to deliver the bunch to one side, out of the subsequent path of the team and machine.

The full nature of my invention will appear from the accompanying drawings and the description and claims following.

In the drawings, Figure 1 is a side elevation of my buncher attachment for a mowing-machine. Fig. 2 is a section on the line A A of Fig. 1. Fig. 3 is a section on the line B B of Fig. 2. Fig. 4 is a plan of the attachment. Fig. 5 is a side elevation of a modified form, the front part being broken away.

This attachment is intended to be secured by any convenient means to the side of the mowing-machine immediately in the rear of the cutter-bar. Such connecting means should be of a readily-attachable nature for the convenient attachment and detachment of this device. Only the attachment or novel portion is here shown, the mowing-machine, except the cutter-bar, being not shown; but any ordinary form of such machine could be used in connection with this attachment.

To the cutter-bar 1 an elevator-frame 2 is attached at its front end by means of supporting-brackets 3 or any other suitable means. Said elevator-frame is provided with suitable side bars to keep the grass from escaping over the side. In the elevator-frame a pair of rollers 5 and 6 are provided, over which a canvas elevator 7 operates. It is provided with suitable cross-slats, as shown, and has been common in elevators. The rear of the elevator-frame is supported by a caster-wheel 23, and it also drives the roller 6 of the elevator. On said roller 6 a sprocket-wheel 8 is secured, that is driven by the chain 9 from the sprocket-wheel 10 on the horizontal shaft 11. The shaft 11 is supported by brackets 12, secured by the cross-bar 13 to the elevator-frame, as is shown in Figs. 1 and 2. On the other end of said shaft 11 a bevel-gear 14 is mounted, that meshes with one face of a double bevel-gear 15, that is loosely mounted on its bearing and rotates horizontally. The other face of the double bevel-gear 15 meshes with a bevel-gear 16, secured to one end of the horizontal shaft 17, that is mounted in the pivoted fork 18. On the other end of the shaft 17 I mount a sprocket-wheel 19, that is driven by a chain 20 from the sprocket-wheel 21, that is secured to the shaft 22, which is rigidly secured centrally to the driving or caster wheel 23. The shaft 22 has bearings at 24 in the two sides of the fork 18. The fork 18 is pivotally mounted in the bracket or bearing 25, which is rigidly connected to the cross-bar 13. The double bevel-gear 15 is loosely mounted to the pivot 26 of said fork 18 and is held between the shoulders of said fork and the bracket 25. Thus the weight of the portion of the device above tends to force the fork 18 into the bracket 25 and hold the bevel-gear 15 in contact with the bevel-wheel 14; but to insure the meshing at all times of said gears 14 and 15 a cotter-pin 27, as shown in Fig. 3, is pivoted. It passes through the bracket 25 and is held in the annular recess 28 of the pivot 26.

A rearwardly-extending platform 30 is at its front end attached to the rear end of the elevator-frame. Said platform is provided with a side delivery and inclines downward from its attachment to the elevator to the point of delivery at the side. It is provided with suitable guard-boards 31, that likewise slant downward to the point of discharge and deflect the hay or straw toward the discharge-point.

With the attachment constructed as so far described it is evident that the grass as cut would be conveyed up the elevator and down the rear platform in a continuous swath to one side of the path of said attachment. In order to bunch it, a separating mechanism is provided, that will hold the grass going up the elevator until the portion on the rear platform has been wholly or partially discharged.

On the elevator-frame 2 I pivotally mount a separating-rake or stop device 40, with rearwardly-extending fingers 41. The main part thereof consists of a cross-bar, with its two ends bent down and pivotally connected with the elevator-frame. It is oscillated backward until the turned-down ends of the part 40 engage the lugs or stops 43.

At the delivery end of the platform 30 I provide a stop device which is not a dropper because it does not support the hay or straw that is periodically discharged, but merely forms an obstruction to the movement of the hay or straw off the inclined platform 30. This may be made in any desired way, two forms here being shown. In Fig. 1 I show a horizontal shaft 32, rotatably mounted at the delivery end of the platform in the bearings 34. The fingers 33 extend upwardly from said shaft. Said stop is actuated by elevating or depressing the said fingers 33. This is done by the crank 35, secured on the shaft 32 and connected by the rod 36 to some suitable means for operation, such as a hand-lever or pedal device upon the mower or main machine.

The modified form of the stop device is shown in Fig. 5. It differs from the other in no respect excepting a board is substituted for the fingers 33. The separating device 40 is actuated by a link 42, connecting the separating device 40 to the crank 35 of the stop device. This means of actuation also causes contemporaneous action of the separating and stop devices.

To make the construction more rigid, I use the brace-bars 29, as seen in Figs. 1 and 3, connecting the cutter-bar with the bracket 25 and the inclined platform 30.

A modified form of the supporting and actuating wheel is shown in Fig. 5. It consists of two ordinary driving-wheels 60, with a spur-gear 61 mounted on one of said wheels and meshing with a spur-gear 62, which replaces the sprocket-wheel 8 shown in the other form. I also show in said modified form a swivel or caster wheel 63 at the extreme rear end of the platform 30, mounted on the bracket 64, that is fastened on the bracket for supporting it.

In the operation of this attachment the elevator carries the hay up and discharges it on the inclined platform 30, and it collects against the stop device at the rear end of said platform. When sufficient hay is collected to constitute a bunch, the separating device and also the stop device are actuated. The former separates the bunch from the hay following it, while the latter permits the hay to slide off the inclined platform to one side of the path of the cutter-bar of the machine and out of the way of the team and machine in the next round.

What I claim as my invention, and desire to secure by Letters Patent, is—

1. A buncher attachment for harvesters including an elevator leading rearward from the cutter-bar, a platform at the rear end of the elevator that slopes downward from the elevator to one side of such platform, and means for holding the hay or straw on the platform until a bunch accumulates.

2. A buncher attachment for harvesters including an elevator leading rearward from the cutter-bar, a platform at the rear end of the elevator which slopes downward to the rear, a guard-board on the outer edge of the platform that extends obliquely to the point of delivery at one side of the platform whereby the hay or straw is deflected to the delivery side of the platform, and means for holding the hay or straw on the platform until a bunch accumulates.

3. A buncher attachment for harvesters including an elevator leading rearward from the cutter-bar of the machine, means for actuating the elevator, a platform at the rear end of the elevator with the discharge to one side thereof and which slopes downward to said point of discharge, and a stop device at the discharge end of the platform.

4. A buncher attachment for harvesters including an elevator leading rearward from the cutter-bar of the machine, means for actuating the elevator, a platform at the rear end of the elevator with the discharge to one side thereof and which slopes downward to said point of discharge, a stop device at the discharge end of the platform, a separating device to separate the bunch of hay or straw on the platform from the portion on the elevator, and means for simultaneously operating both the stop and separating devices.

5. A buncher attachment for harvesters including an elevator-frame secured behind the cutter-bar of the harvester and leading rearward, a wheel for supporting the rear of said frame in an elevated position, an elevator mounted in said frame, means connected with said wheel for driving said elevator, a platform at the rear end of the elevator with the discharge to one side thereof and which slopes downward to said point of discharge, and a stop device at the discharge end of the platform.

6. A buncher attachment for harvesters including an elevator-frame adapted to be secured immediately behind the cutter-bar of a harvester, an elevator mounted therein, means for driving the elevator, a platform at the rear end of the elevator with the discharge to one side and which slopes downward to said point of discharge, a stop device at the discharge end of said platform, a crank secured thereto whereby it may be oscillated into a closed or open position, means connected with the harvester for actuating said crank, a separating device consisting of a bar extending across the elevator with its ends bent and pivoted to the sides of the elevator-frame, fingers secured to the horizontal portion of said bar, and a link connecting said bar with the crank on the stop device whereby they will act simultaneously.

In witness whereof I have hereunto affixed my signature in the presence of the witnesses herein named.

JOHN W. HULL.

Witnesses:
AMANDUS N. GRANT,
ROBT. D. HAWKINS.